Figure 1:
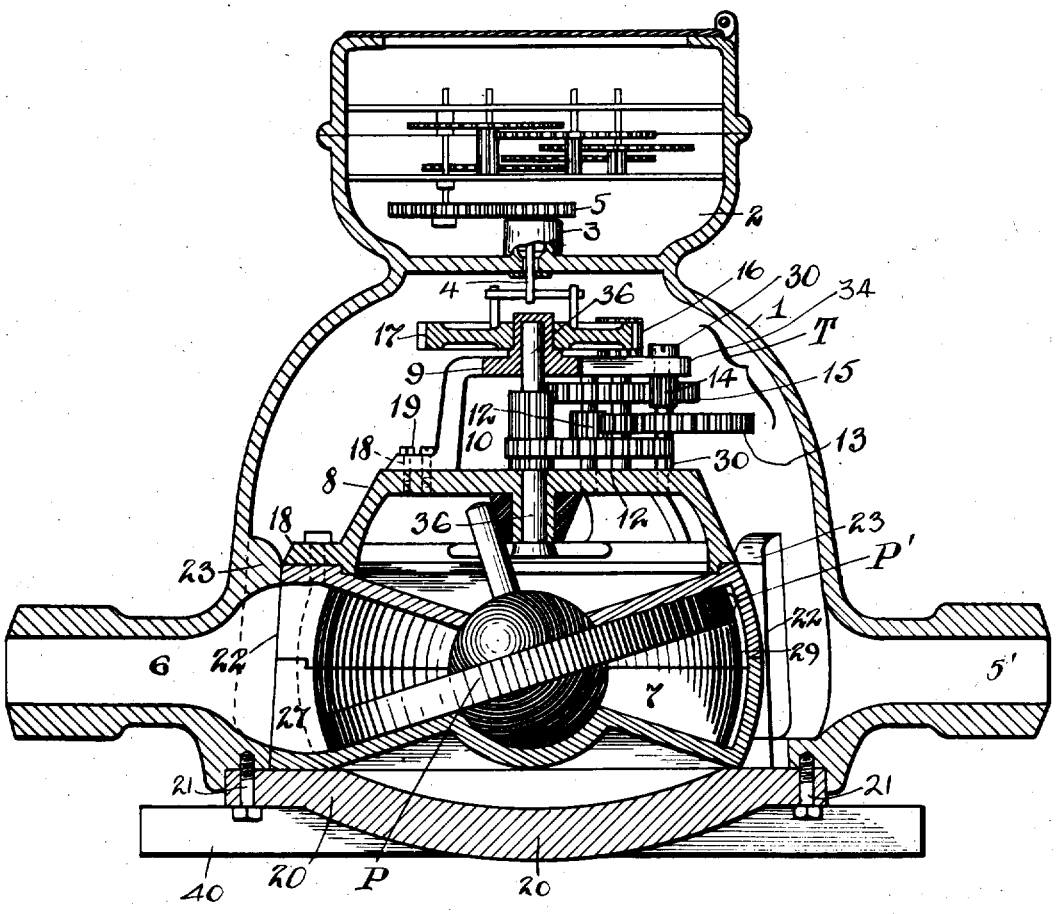

F. W. HANKS.

WATER METER.

APPLICATION FILED MAR. 16, 1915.

Reissued Apr. 2, 1918.

14,455.

2 SHEETS—SHEET 1.

Witnesses
O. M. Kappler.
Thos. H. Fay.

Inventor
Frederick W. Hanks
by Fay, Oberlin and Fay
Attorneys

F. W. HANKS.

WATER METER.

APPLICATION FILED MAR. 16, 1915.

Reissued Apr. 2, 1918.

14,455.

2 SHEETS—SHEET 2.

Witnesses=
O.M. Kappler
Thos. H. Fay

Inventor
Frederick W. Hanks
by Fay, Oberlin and Fay
Attorneys.

UNITED STATES PATENT OFFICE.

FREDERICK W. HANKS, OF CLEVELAND, OHIO.

WATER-METER.

14,455. Specification of Reissued Letters Patent. Reissued Apr. 2, 1918.

Original No. 1,065,939, dated July 1, 1913, Serial No. 388,527, filed August 14, 1907. Application for reissue filed March 16, 1915. Serial No. 14,849.

*To all whom it may concern:*

Be it known that I, FREDERICK W. HANKS, a citizen of the United States, residing at Cleveland, in the county of Cuyahoga and State of Ohio, have invented new and useful Improvements in Water-Meters, of which the following is a specification.

The general objects of the invention are to provide a water meter or measuring device adapted to operate under all conditions of temperature and service and with water at all fluid temperatures whether boiling hot or cold and to provide a nutating piston for this purpose adapted for use in hot or cold water without injury.

A further object is to provide a gear train for the control of the registering mechanism which is characterized by improved efficiency and durability in use, and which by slight adjustment of bearings can be made to last for an indefinite period of time with unabated usefulness.

A further object is to provide a direct path for the circulation of the fluid through the gear train and in this manner to attain immunity for the gearing from the action of electrolysis or from galvanic action incident to their immersion in dead or lifeless water such as accumulates about the gearing in the main case in the ordinary forms of construction.

A further object is to provide forms of main case, measuring or piston chamber and crown frame, and bearing plate for the gear train, attached directly to the measuring chamber and so arranged that all the interior and working parts can be removed in one assembled mass, and hence increase the accessibility of all parts and their adaptability to adjustment and repair. This form of construction also permits reversal of the motor in any position without interfering with its use.

Further objects are to provide a removable bottom which with all the inner parts can be bodily removed and which is adapted and arranged to break and release the working parts and prevent the destruction of any part of the meter except the bottom in case of excessive internal pressure as from the action of frost.

The objects further include improvements in the simplicity and unity in the construction of the meter and comprise also the improvements in the construction of details and combination and arrangement of the various parts as hereinafter described, shown in the accompanying drawings and specifically pointed out in the claims.

Figure 2:
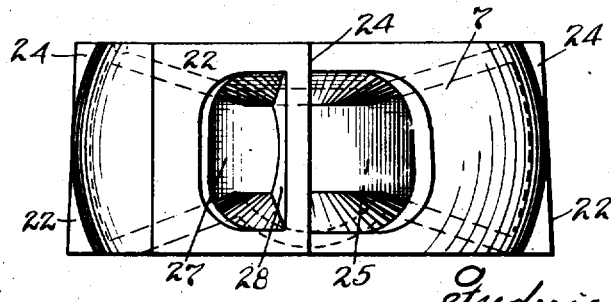
Figure 3:
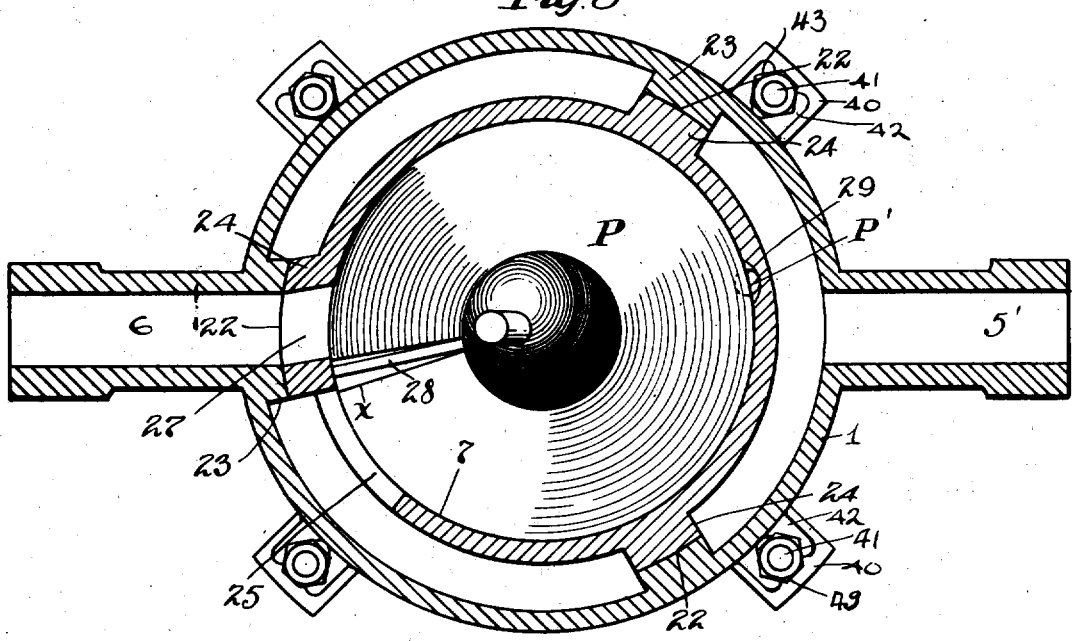
Figure 4:
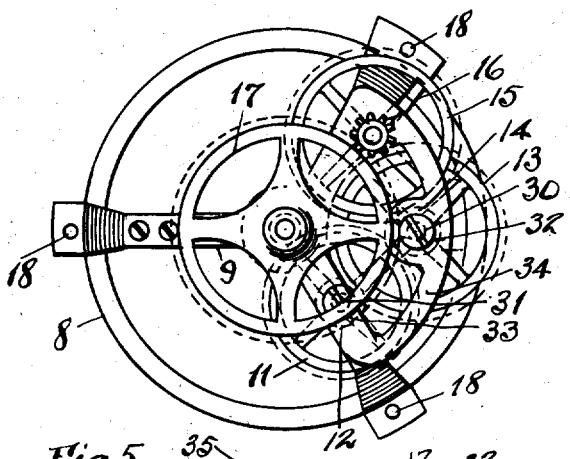
Figure 5:
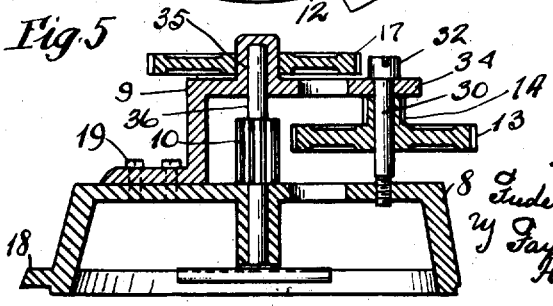

In the accompanying drawings, Figure 1 is a central vertical section of the improved device; Fig. 2 is a side view of the measuring or piston chamber showing inlet and outlet orifices therein, and radial partition; Fig. 3 is a horizontal transverse section through the main case and piston chamber showing relative location of the inlet and outlet orifices; Fig. 4 is a plan view of the controlling gear train and the crown frame and bearing plate arranged for the support of the same; and Fig. 5 is a vertical sectional view of the crown frame and bearing plate showing one of the screw threaded spindles, adapted to afford adjustment for the renewal of the bearing surfaces.

In these views 1 is the main case of a substantially dome shape and having integral therewith the lower half 2 of the register box, and an integral stuffing box 3 for the stuffing box spindle 4 and stuffing box gear 5. The lower end of this case 1 is provided with oppositely located inlet and outlet openings 5′ and 6 respectively. The measuring or piston chamber 7 forms the support for the crown frame 8 and bearing plate 9 mounted thereon, upon which, the gear train T comprising pinion and spur reducing gears 10, 11, 12, 13, 14, 15, 16 and 17 are mounted. By means of this train of gears the speed of revolution of the piston is reduced to the exact degree desired. These parts, consisting of the measuring chamber and crown frame and bearing plate, are secured together by means of lugs 18 and screws 19, and a single bottom plate 20 detachably secured to the main case by bolts 21 forms a complete assembled body, and the opening in the main case which receives the measuring chamber is tapered outwardly and the engaging portions of the measuring chamber are similarly tapered at 22 so as to form a tight fit therewith. The bottom is detachably secured by bolts 21 as shown. In this manner the working parts are strongly and durably supported and connected together and the device will operate as well upside down as right side up. The bottom cover 20 is preferably breakable so that the measuring chamber and case will not be destroyed at a low degree of temperature.

If desired, the entire structure may be mounted upon base members 40 by means of bolts 41 which pass through said base members and through lugs 42 carried by the main case 1. Nuts 43 are threaded upon these bolts and bear against said lugs to hold the case upon the base members 40.

The engaging parts of the measuring chamber and main case are preferably formed in the ribs 23 and 24. The ribs 23 are so spaced as to form with the ribs 24 vertical passages through which the water will flow from the inlet opening 5′ and will take its passage up over the measuring chamber and down into the inlet opening 25 in this chamber. Thence the water will pass through this chamber and after operating the disk valve P will pass out the outlet opening 27 and main outlet 6. A radial partition 28 separates the inlet and outlet openings in this chamber. A complete circulation through the gear train T is thus formed which prevents the water surrounding the gears from becoming "dead" and prevents the setting up of any galvanic or electrolytic action therein which ordinarily is the source of gradual disintegration of the gears. The water itself will not corrode them since they are made of bronze.

By reference to the drawings particularly Fig. 3 it will be seen that an important advantage is derived from the independent character and horizontal adjustability of the measuring chamber for the reason that the relative positions of the outlet openings in the measuring chamber and case can be adjusted so as to reduce the outlet opening if desired, which has the effect of lessening the strain upon the piston under very great pressure.

The disk shaped piston P is peculiar in being made very wide between striking surfaces, and hence has a wide bearing surface upon the circular walls of the chamber. Also to prevent danger of breakage of the edges of the radial slot X in the disk upon the partition a ball P′ is inserted in the opposite edge of the disk, which is designed to travel in a vertical groove 29 in the wall of the chamber and hence keep the disk from rubbing on the partition. The body of the disk is also novel in being formed of materials or a substance which while being rigid is also not hard enough to produce any great degree of friction. This disk is formed of a composition containing graphite and other refractory materials. It is also formed of material or a substance which is only slightly affected by extreme degrees of heat or cold and hence the device can be employed with hot water as well as cold and is desirable for use in buildings using hot water, where the hot water in the circulating pipes sometimes backs up into the meter. Ordinarily meter valves formed of compositions containing rubber or gutta-percha are liable to destruction from the effects of heat thereon.

To provide means for removing the bearing surfaces of the gear spindles in the gear train two of the spindles or shafts in the outer row at 30 and 31 are formed as screws. These screws have large heads 32 and 33 which rest upon the bearing plate and are inserted in the crown frame. When the inner sides of the bearing surfaces of these screws become worn a fresh surface can be immediately supplied by turning the screws partially around in the crown frame. Another important result is also obtained by this action viz. as the screws are turned their heads press down the outer portion 34 of the bearing plate and thereby press the inner surface of the central bearing 35 into contact with the central driving spindle 36. In this manner the bearings can be almost indefinitely renewed at pleasure and the utility of the device for all possible situations many of them difficult of access greatly enhanced.

The bottom 20 is not attached to the measuring chamber but when attached to the main case secures the measuring chamber and all the working parts in place.

I believe myself to be the first to make the piston disk of anti-friction material which will be affected only by extreme degrees of heat and cold, or is partially refractory.

I am aware that disks for this purpose have been made of vulcanite or hard rubber, but these disks are affected by heat and warped out of shape. Many materials are suitable for this purpose, but the specific composition does not pertain to the spirit of this invention.

The disk piston including the ball and disk is composed largely of a self lubricating non-frictional compound, such as graphite, which is also refractory in character. Other ingredients are india rubber and sulfur, in sufficient quantity to permit vulcanizing the whole into a solid mass. Other ingredients to give body to the piston may be powdered graphite, or fullers' earth. If the graphite could be compressed sufficiently to hold together, no rubber or sulfur, and vulcanizing would be required. Graphite is the most important ingredient. Many methods of molding and solidifying the same can be used.

Having described the invention what I claim as new and desire to secure by Letters Patent is:—

1. In a water meter, a main case, having an opening in its bottom and oppositely located inlet and outlet openings and provided with vertically arranged ribs spaced upon its inner surface, a measuring chamber located within said main case, said chamber having vertical ribs upon its outer edges corresponding to the ribs within said main case, the meeting surfaces of said ribs on case and chamber being tapered upwardly, said chamber provided with an outlet opening registering with the outlet opening of the main case, and also provided with an inlet opening adjacent to said outlet opening and a partition separating said openings in the measuring chamber, said ribs in said main case and measuring chamber forming a passage whereby the fluid is conducted over said measuring chamber, substantially as described.

2. In combination in a water meter, a substantially dome shaped main case having an opening in its bottom, a measuring chamber therein, a crown plate and depressible bearing plate mounted upon said measuring chamber, a controlling gear train thereon, a breakable bottom plate for the main case upon which said measuring chamber and crown plate, bearing plate and gear train are assembled, and an integral stuffing box and portion of a register box upon said main case, substantially as described.

3. In combination in a water meter, a substantially dome shaped main case, having oppositely located inlet and outlet openings and having a bottom opening said case being provided with vertical ribs on its interior walls, the inner faces of said ribs being upwardly tapered and said inlet opening between said ribs, a measuring chamber inserted in said bottom opening in said chamber and provided with ribs on its outer surface corresponding in location and taper with the ribs on the said chamber, said chamber having an outlet opening registering with the outlet opening in the said main case, and passing through one of said ribs on the chamber, said chamber having also an inlet opening adjacent to said outlet opening and opposite to the inlet opening in the case, a disk piston in said chamber, a controlling gear train mounted upon said measuring chamber and bearing supports for said train assembled upon said chamber, said piston having operative connection with said gear train, the said ribs upon said case and chamber being spaced to provide a passage for the fluid passing through said meter, leading from the inlet opening in said case through said gear train to the inlet opening in the chamber, substantially as described.

4. In combination in a water meter, a main case, having an integral register box portion and an integral stuffing box thereon, and provided with opposite openings for inlet and outlet respectively and with a bottom opening, a measuring chamber therein, a crown plate and depressible bearing plate upon said measuring chamber and a gear train thereon, a bottom plate for said case adapted to close said opening, said chamber, gear train and crown and bearing plates being removable from said casing in one assembled body, means for securing said parts together and means for securing said parts to said main case, substantially as described.

5. In a water meter, a measuring chamber, a controlling gear train mounted thereon, a crown plate and an upper bearing plate having a depressible portion and secured to said measuring chamber in which crown and bearing plate said gear train is mounted, a piston in said chamber operatively connected with said controlling gear train, and bearing spindles for the gears in said gear train, the spindles passing through the depressible portion of said bearing plate being screw threaded and provided with heads engaging said depressible plate as and for the purpose set forth.

6. In combination with the controlling gear train of a water meter, a crown plate and an upper bearing plate having a depressible portion, and spindles for the gears of said train having screw threads inserted in said crown plate and heads engaging said depressible plate, substantially as described.

7. In a water meter, a main case of substantially dome shape provided with oppositely placed inlet and outlet openings and a bottom opening, a measuring chamber, a disk and piston therein adapted to be inserted into said bottom opening, crown and depressible bearing plates, and a control gear train thereon assembled upon said measuring chamber and removable therewith, the said piston being made of refractory material only affected by great extremes of temperature and having a broad bearing surface.

8. In a water meter the combination with a main case closed at the upper end and having an opening in the bottom and opposite inlet and outlet openings, of a measuring chamber adapted to be inserted in the bottom, and provided with closely adjacent inlet and outlet openings, said main case and measuring chamber having registering ribs tapering on their meeting edges, and forming a tapered bearing for said measuring chamber, a breakable cover for said opening and means for detachably securing said cover to said casing, substantially as described.

9. In a water meter, the combination with a main case, having an opening in its bottom and oppositely located inlet and outlet openings, of a measuring case, and a piston therein, and a controlling gear train mounted upon said measuring chamber and secured thereto, said measuring chamber and attached gear train and piston being insertible into said case through said bottom opening, said measuring chamber having closely adjacent inlet and outlet openings, a vertical partition in said case on each side of the inlet opening therein and a vertical partition in said case separating the inlet and outlet openings in said measuring chamber, a tapered socket for said measuring chamber in said case and tapered bearing surfaces registering therewith on said chamber and a breakable cover for said opening detachably secured to said case, the said vertical partitions being so spaced as to direct the incoming fluid upwardly and through the controlling gear, directly to the inlet passage in said measuring chamber, substantially as described.

10. In a water meter, the combination with a main case provided with a bottom opening and with oppositely located inlet and outlet openings, of a measuring chamber adapted to be inserted into said case through said bottom opening, registering tapered ribs upon said main case and measuring chamber, whereby tapered socket and bearing surfaces are formed in the main case and measuring chamber, and a cover for said bottom opening in said case and means for detachably securing said cover to said case, the said ribs being spaced to form a channel for fluid entering said inlet opening, leading over said measuring chamber and the outlet passages from measuring chamber and main case passing through engaging ribs on said members, substantially as described.

11. In a water meter, in combination, a main case having a bottom opening and opposite inlet and outlet openings, a measuring chamber, the controlling gear train and supporting bearings assembled thereon, and provided with closely adjacent inlet and outlet openings, the outlet opening registering with the outlet opening in the case, the said assembled parts being removable through said bottom opening and engaging ribs on the main case and measuring chamber, said engaging ribs forming a channel leading from the inlet opening in said main case over said measuring chamber to the inlet opening in said measuring chamber, the said outlet openings from said measuring chamber and main case passing between pairs of engaging ribs and a cover for said bottom opening, secured to said main case, substantially as described.

12. In a disk water-meter, the combination with the disk, of a bearing ball attached thereto consisting of a self-lubricating material containing graphite.

13. In a disk water-meter, a disk having its peripheral frictional surface formed by a self-lubricating material containing graphite.

14. In a disk water-meter, a disk having a slot, the frictional surface of the slot being formed of a self-lubricating material containing graphite.

15. As an article of manufacture, a disk-piston for water-meters, constructed of refractory non-metallic material, including graphite in quantity sufficient to have a self-lubricating effect.

16. As an article of manufacture, a refractory non-metallic disk-piston for water-meters having a bearing ball and a radial slot, said disk-piston being constructed of refractory material including graphite in quantity sufficient to render such ball and the walls of the slot, as well as the peripheral surface of said piston, self-lubricating.

17. As an article of manufacture, a refractory non-metallic disk-piston for water-meters, constructed of rubber and sulfur vulcanized together with graphite in quantity sufficient to have a self-lubricating effect.

18. As an article of manufacture, a refractory non-metallic disk-piston for water-meters having a bearing ball and a radial slot, said disk-piston being constructed of rubber and sulfur vulcanized together with graphite in quantity sufficient to render such ball and the walls of the slot, as well as the peripheral surface of said piston, self-lubricating.

19. In a water-meter, the combination with a main case having inlet and outlet openings; of a separate measuring chamber mounted within said main case and having inlet and outlet openings adapted to communicate with the inlet and outlet openings, respectively, of said main case, the passages for the flow of fluid through said case and chamber being arranged and constructed so as to prevent such flow around said chamber, whereby such fluid is conducted over the latter in passing through the meter, substantially as described.

20. In a water meter, the combination with a main case having inlet and outlet openings; of a separate measuring chamber mounted within said main case and having inlet and outlet openings adapted to communicate with the inlet and outlet openings, respectively, of said main case; a piston in said chamber; and a gear train mounted upon said chamber and operatively connected with said piston, the passages for the flow of fluid through said case and chamber being arranged and constructed so as to prevent such flow around said chamber, whereby such fluid is conducted over the latter and across said gear train in passing through the meter, substantially as described.

21. In a water-meter, the combination with a main case having inlet and outlet openings; of a separate measuring chamber mounted within said main case and having inlet and outlet openings adapted to communicate with the inlet and outlet openings, respectively, of said main case; a piston in said chamber; a gear train mounted upon said chamber and operatively connected with said piston; and guides for the fluid arranged to secure a direct flow thereof over the chamber and through said gear train in passing through the meter, substantially as described.

22. In a water meter, the combination with a main case having substantially oppositely disposed inlet and outlet openings; of a measuring chamber mounted within but spaced laterally from said main case, said chamber having an outlet opening adapted to register with the outlet opening of said case and having an inlet opening adjacent to such outlet opening; a piston in said chamber; a gear train mounted upon said chamber and operatively connected with said piston; and ribs in the space between said case and chamber arranged to direct the fluid over the latter and across said gear train in passing from the inlet opening in the former to the inlet opening in the latter.

23. In a water meter, the combination with a main case having substantially oppositely disposed inlet and outlet openings; of a measuring chamber mounted within but spaced laterally from said main case, said chamber having an outlet opening adapted to register with the outlet opening of said case and having an inlet opening adjacent to such outlet opening; a piston in said chamber; a gear train mounted upon said chamber and operatively connected with said piston; and complementary ribs on the inner surface of said case and the outer surface of said chamber forming a passage adapted to direct the fluid over said chamber and across said gear train in passing from the inlet opening in said case to the inlet opening in said chamber.

24. In a water meter, the combination with a main case having inlet and outlet openings; of a separate measuring chamber mounted within said main case and having inlet and outlet openings adapted to communicate with the inlet and outlet openings, respectively, of said main case; and ribs in the space between said case and chamber arranged to direct the fluid over the latter in passing from the inlet opening in the former to the inlet opening in the latter.

25. In a water meter, the combination with a main case having inlet and outlet openings; of a separate measuring chamber mounted within said main case and having inlet and outlet openings adapted to communicate with the inlet and outlet openings, respectively, of said main case; and ribs in the space between said case and chamber arranged to direct the fluid over the latter in passing from the inlet opening in the former to the inlet opening in the latter, the aforesaid outlet openings passing through one of said ribs.

Signed by me this 13th day of March, 1915.

FREDERICK W. HANKS.

Attested by—
M. RECKTENWALT,
H. M. KATHE.